US007676306B2

(12) United States Patent
Kubo et al.

(10) Patent No.: US 7,676,306 B2
(45) Date of Patent: Mar. 9, 2010

(54) VEHICLE BEHAVIOR ANALYSIS SYSTEM

(75) Inventors: Noboru Kubo, Tsukuba (JP); Tsuyoshi Katayama, Tsukuba (JP); Toshihiro Arai, Tsukuba (JP); Tatsuya Kobayashi, Tsukuba (JP); Sou Kitajima, Tsukuba (JP); Kazuki Yamaguchi, Kyoto (JP); Shigenori Ryu, Kyoto (JP); Masatomo Ishikura, Kyoto (JP)

(73) Assignees: Japan Automobile Research Institute, Tokyo (JP); Horiba, Ltd., Kyoto (JP)

( * ) Notice: Subject to any disclaimer, the term of this patent is extended or adjusted under 35 U.S.C. 154(b) by 47 days.

(21) Appl. No.: 11/545,303

(22) Filed: Oct. 10, 2006

(65) Prior Publication Data

US 2007/0173994 A1 Jul. 26, 2007

(30) Foreign Application Priority Data

Jan. 26, 2006 (JP) .......................... P2006-018077

(51) Int. Cl.
*G01M 17/00* (2006.01)
*G06F 7/00* (2006.01)
*G06F 19/00* (2006.01)

(52) U.S. Cl. ........................................................ 701/35

(58) Field of Classification Search .................... 701/35
See application file for complete search history.

(56) References Cited

U.S. PATENT DOCUMENTS

| | | | | |
|---|---|---|---|---|
| 4,258,421 | A * | 3/1981 | Juhasz et al. | 701/35 |
| 6,246,933 | B1 * | 6/2001 | Bague | 701/35 |
| 6,643,571 | B2 * | 11/2003 | Gotvall et al. | 701/33 |
| 2004/0267419 | A1 * | 12/2004 | Jeng | 701/36 |

FOREIGN PATENT DOCUMENTS

JP 05-197858 6/1993

* cited by examiner

*Primary Examiner*—Khoi Tran
*Assistant Examiner*—Bhavesh V Amin

(57) ABSTRACT

A vehicle behavior analysis system performs an analysis of vehicle operation by displaying behavior data in an organized and analyzed form. A vehicle behavior data collecting unit records information on the vehicle's driving as behavior data and an analysis unit analyzes a recorded content of the vehicle behavior data collecting unit. A recorded data unit obtaining part obtains the recorded data units recorded in a memory of the vehicle behavior data collecting unit and a displaying part displays the content concerning at least a predetermined item among the contents shown by obtained each recorded data unit in a form of a table sectioned for each recorded data units and arranged at a side of the analysis unit, and a risk degree calculated based on the content shown by each recorded data units is contained in the predetermined item displayed by the displaying part.

10 Claims, 10 Drawing Sheets

VEHICLE BEHAVIOR ANALYSIS SYSTEM

BACKGROUND OF THE INVENTION

1. Field of the Invention

This invention relates to a vehicle behavior analysis system that records behavior or a surrounding situation of a motor vehicle during a certain period before and after a time of an accident or a time when a driver feels concern because he or she is close to being involved in an accident even though this situation does not result in an accident and that makes an after-the-fact analysis why the motor vehicle got involved in the situation.

2. Related Art

Recently, a vehicle-mountable driving recorder has been developed as a vehicle behavior data collecting unit that can automatically record an image of outside or inside of a motor vehicle (an automobile) while driving and make an after-the-fact analysis on an objective situation consequently of a driver's driving tendency at a time of an accident or at a time when a driver feels concern because he or she is close to being involved in an accident. There is a trend that this kind of a driving recorder should be mounted on, for example, a taxi in order to prevent an accident by making the after-the-fact analysis on a usual driving or to investigate an objective evidence of a cause of an accident when the accident occurs.

The vehicle behavior data collecting unit of this type sequentially and chronologically records behavior data such as image data of both outside and inside the vehicle while the vehicle is driving, acceleration data, speed data or position data in a memory. An objective analysis of an accident can then be made by reference to the behavior data stored in the memory by the use of another device, see Japanese Laid Open Patent Application No. 5-197858.

However, it takes time and labor to secure the desired data from chronologically consecutive and lengthy behavior data in the case of trying to make a timely analysis of the recorded behavior data after the fact. This is because it is very troublesome to judge what has happened and the place where it happened at a glance just by surveying the lengthy behavior data.

SUMMARY OF THE INVENTION

The present claimed invention provides a vehicle behavior analysis system that can make such an after-the-fact analysis easily and accurately by displaying behavior data in an organized and analyzed format.

More specifically, the vehicle behavior analysis system in accordance with the present claimed invention is arranged on a vehicle and comprises a vehicle behavior data collecting unit that can record information on the vehicle's driving operation as being behavior data and an analysis unit for analyzing a recorded content of the vehicle behavior data collecting unit. The vehicle behavior data collecting unit comprises a sampling part that samples the behavior data sequentially and a data recording part that records, in the case that a content of the sampled behavior data meets a predetermined condition, behavior data during a certain time period before and after the sampled behavior data as recorded data units in a built-in memory. The analysis unit comprises a recorded data unit obtaining part that obtains the recorded data units recorded in the memory of the vehicle behavior data collecting unit and a displaying part that displays the content concerning at least a predetermined item among the contents shown by obtained each recorded data unit in the form of a table sectioned for each recorded data unit on a display, wherein a risk degree, calculated based on the content shown by each recorded data unit, is contained in the predetermined item displayed by the displaying part.

In addition, the analysis unit in accordance with the present claimed invention permits analyzing a recorded content of a vehicle behavior data collecting unit that comprises a sampling part that sequentially samples behavior data as being information concerning a vehicle's driving history and a data recording part that records, in case that a content of the sampled behavior data meets a predetermined condition, behavior data during a certain time period before and after the sampled behavior data as recorded data units in a built-in memory, and comprises a recorded data unit obtaining part that obtains the recorded data units from the vehicle behavior data collecting unit and a displaying part that displays the content concerning at least a predetermined item among the contents shown by obtained each recorded data unit in a form of a table sectioned for each recorded data unit on a display, and is characterized by a risk degree calculated based on the content shown by each recorded data unit contained in the predetermined item displayed by the displaying part.

In accordance with this arrangement, since it is possible to pick out data that meets a predetermined condition and that has high possibility to relate to an occurrence of an accident or a case that might result in an accident such that a driver feels concern because he or she is close to being involved in an accident even though it does not result in an accident and to classify the picked out recorded data units by making use of the risk degree as an index, it is therefore possible to display behavior data in an organized and analyzed form to some extent. Then it becomes-easy to extract the intended recorded data units. As a result, it is possible to easily and accurately make an after-the-fact analysis such as a cause analysis of an accident at the time of an accident or a cause analysis of a situation at a time when a driver feels concern because he or she is close to being involved in an accident and furthermore to examine a driver's driving tendency.

In order to make it possible to extract and analyze data more efficiently by making use of a visual aid of displaying a position of a vehicle or a surrounding image of a vehicle in conjunction with the above-mentioned table, it is preferable that the recorded data units contain information on a position of the vehicle and/or a recorded image of a driving condition of the vehicle. The analysis unit further comprises an input receiving part that receives a designated input for part of the recorded data units, and the displaying part displays a map showing a place where the recorded data units are recorded and/or the recorded image contained in its recorded data units on the same display for the recorded data units designated by the input receiving part.

In order to calculate the risk degree efficiently and automatically, it is preferable that the vehicle behavior analysis system further comprises a risk degree calculating part that calculates the risk degree. The risk degree calculating part may be arranged in the analysis unit or may be arranged in the vehicle behavior data collecting unit.

The method for calculating the risk degree is not particularly limited. For example, in the case that the recorded data units contain vehicle acceleration data, the risk degree can be calculated based on a peak acceleration shown by the vehicle acceleration data -and a substantial acceleration applying period containing a time of the peak acceleration.

The acceleration applying period can be derived from, for example, derivative value data obtained by conducting a differentiation once or multiple times on the vehicle acceleration data, and the vehicle acceleration data.

In accordance with an arrangement of the present claimed invention, it is possible to display behavior data extracted by the vehicle behavior data collecting system in an organized and analyzed form to some extent, which makes it possible to make an after-the-fact analysis easily and accurately.

DETAILED DESCRIPTION OF THE PREFERRED EMBODIMENTS

Figure 1:
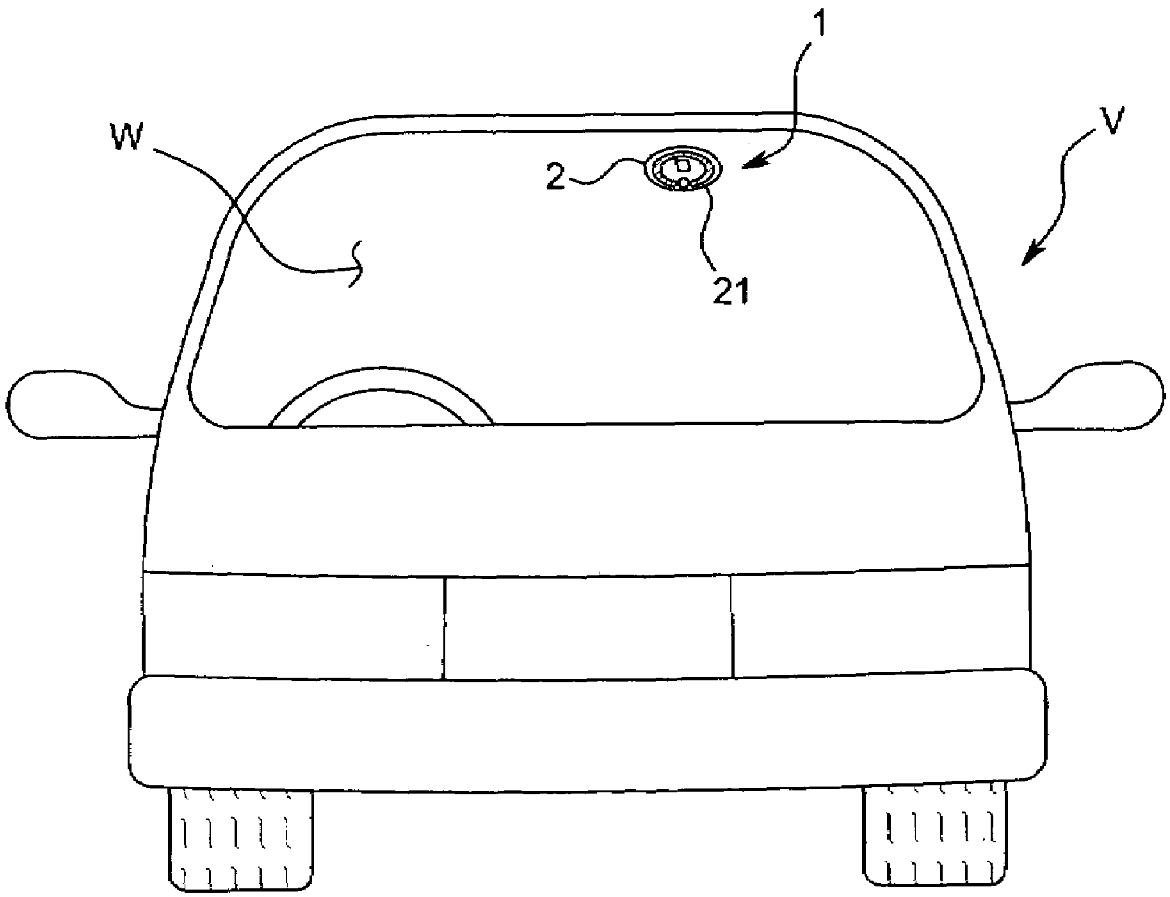
FIG. 1 is a pattern front view showing a case that a driving recorder in accordance with one embodiment of the invention is mounted on a vehicle.

An embodiment of the present claimed invention will be described with reference to the accompanying drawings.

A driving recorder 1 is provided as a vehicle behavior data collecting unit in accordance with this embodiment, as shown in FIG. 1 through FIG. 5, and can record behavior, a surrounding situation or an operating condition of a motor vehicle V during a certain time period before and after a time of an accident or at a time when a driver feels concern because he or she is close to being involved in an accident. The driving recorder 1 is shown schematically in FIG. 4 and in perspective views in FIGS. 2 and 3 and comprises a single casing 2, a sampling part 3 held by the casing 2, an annunciation device 4, an input device 5, a communication device 6, a removable recording device 7, an information processing device 8 and an auxiliary power supply 9. The driving recorder 1 can be attached to an arbitrary place on an automobile windshield W through an adhesive pad 21 having predetermined heat conductivity.

Next, each part will be described.

Figure 2:
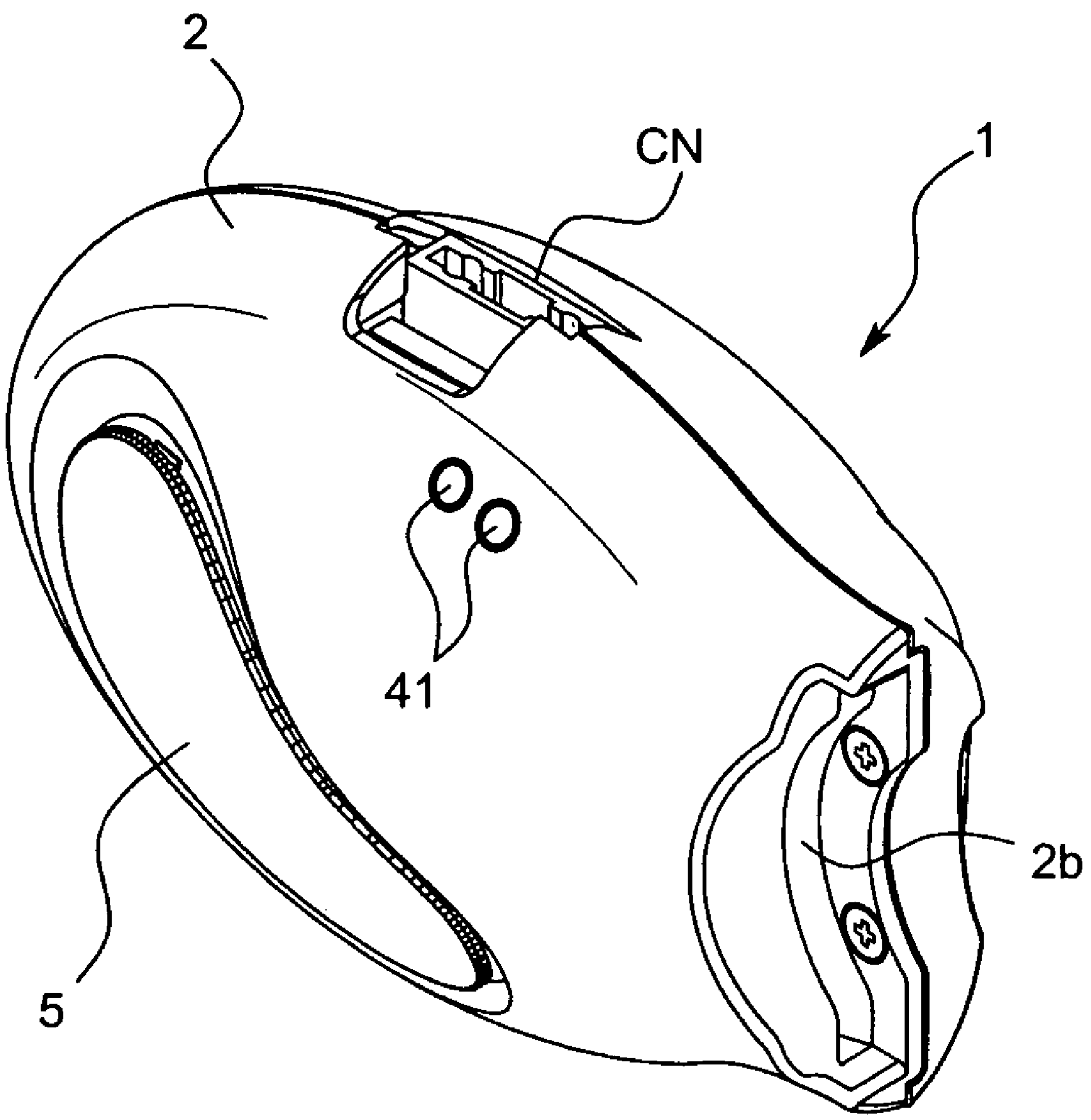
FIG. 2 is a perspective view of the driving recorder in accordance with this embodiment viewed from inside of the vehicle.
Figure 3:
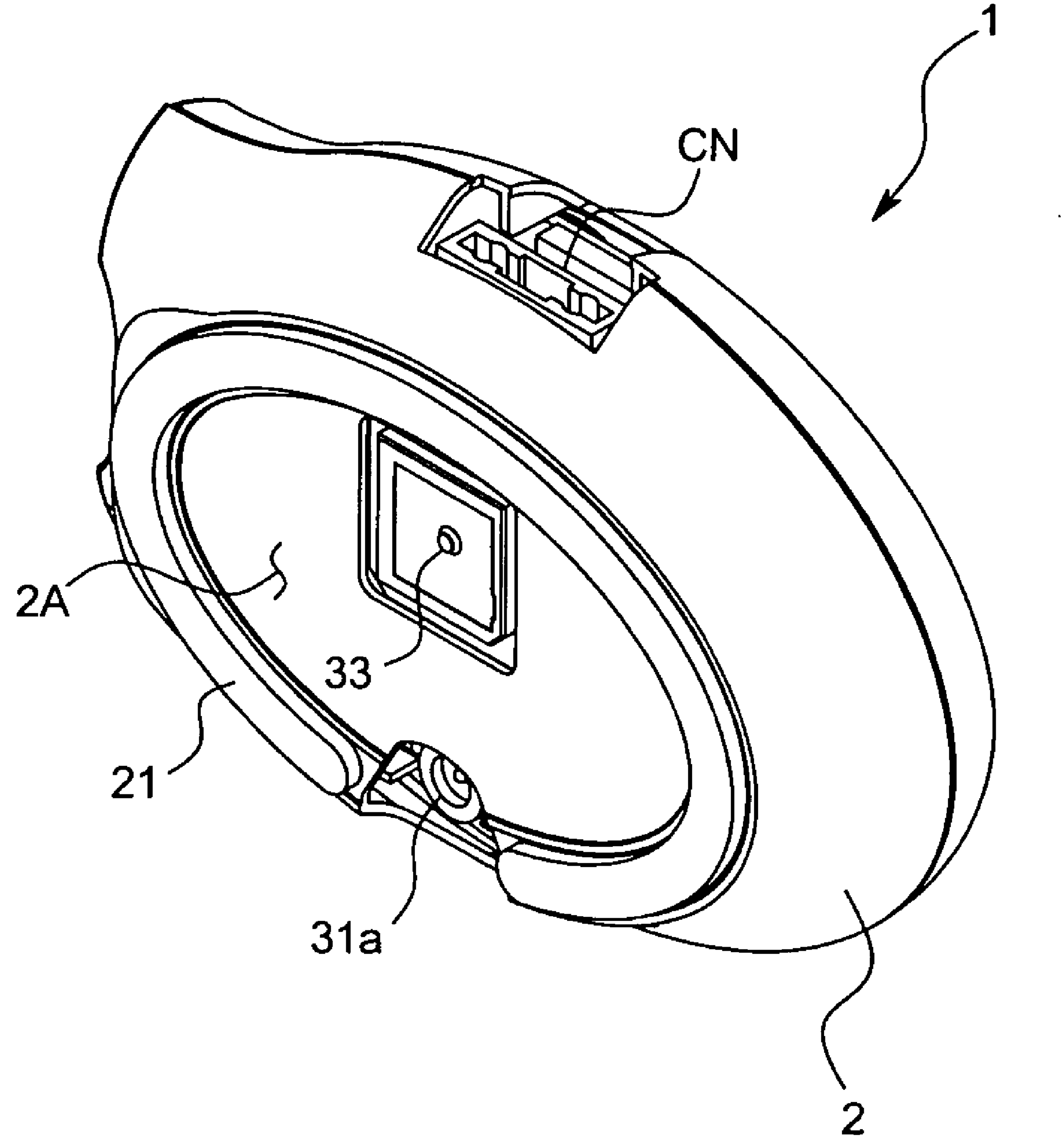
FIG. 3 is a perspective view of the driving recorder in accordance with this embodiment viewed from outside of the vehicle.

The casing 2 is, as shown in FIG. 2 and FIG. 3, of generally an egg-shaped form made of metal (magnesium alloy), wherein a flat surface part 2A of generally elliptical shape, formed by cutting a part of the egg-shaped form with a flat surface, is arranged in a part of the casing 2 and an outer circumferential part of the flat surface part 2A is attached to the automobile windshield W through the adhesive pad 21 of a generally elliptic zonation having adherence and elasticity.

Figure 4:
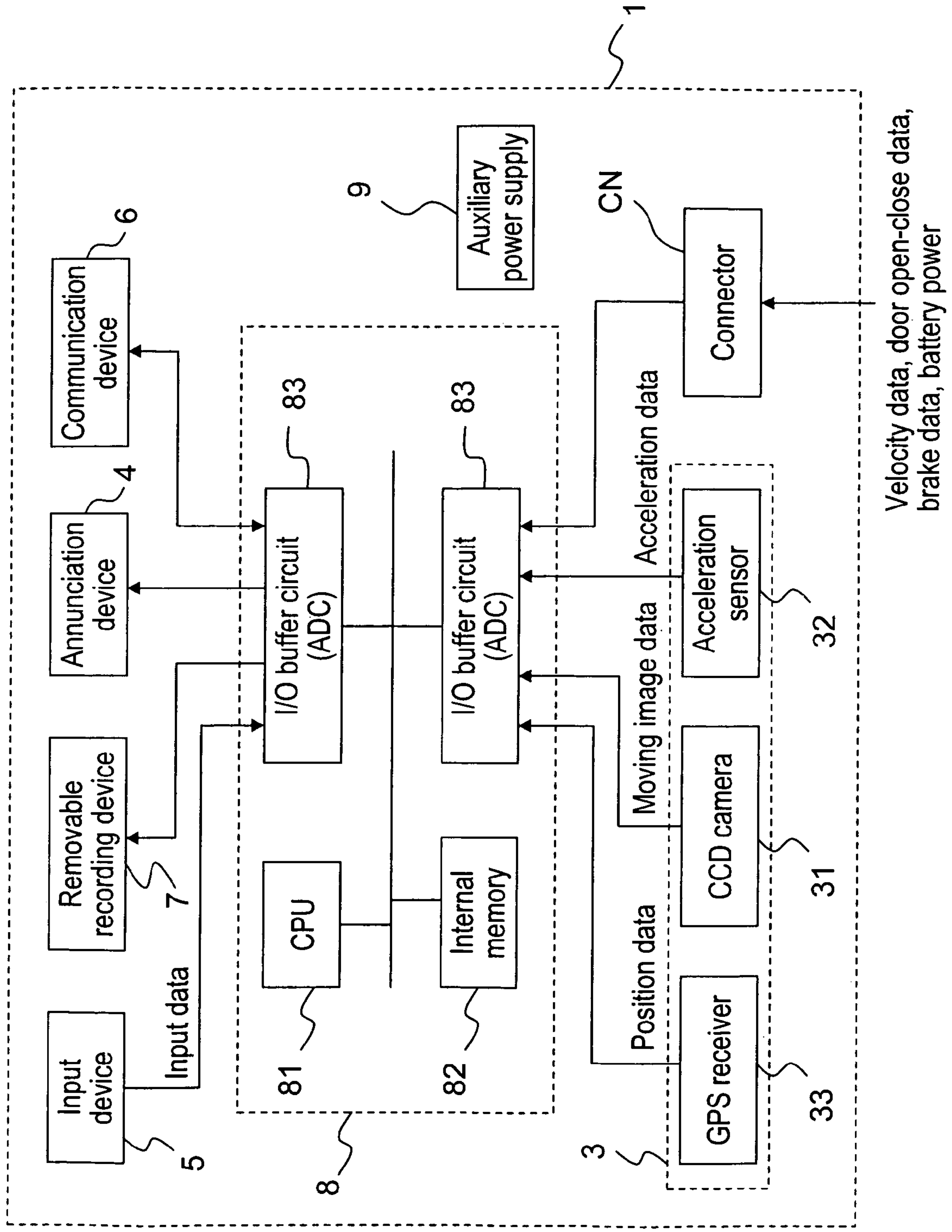
FIG. 4 is a pattern structural view of the driving recorder in accordance with this embodiment.

The sampling part 3, as shown in FIG. 4, senses the driving behavior, the surrounding situation or the operating condition of the motor vehicle V and outputs behavior data showing a content of the behavior, the surrounding situation or the operating condition. The sampling part 3 uses at least a CCD camera 31 as being an imaging device, an acceleration sensor 32 and a GPS receiver 33 as being a position sensor.

The CCD camera 31 takes an image of a condition of outside the vehicle V and outputs moving image data showing its image as the behavior data, and an image reception area 31*a* is exposed to the casing flat surface part 2A that faces the automobile windshield W. The image reception area 31*a* is movable so that it can be set to face to a desired direction to take the image in accordance with a position of the automobile windshield W on which the CCD camera 31 is mounted.

The acceleration sensor 32 is of an arrangement that makes use of, for example, a Piezo resistance effect, and senses acceleration of one dimension through three dimensions (back and front, right and left, up and down, for example, in case of three dimensions) that applies to the motor vehicle V, and outputs the acceleration data showing its acceleration as the behavior data.

The GPS receiver 33 senses a position of the motor vehicle V by receiving electromagnetic waves from, for example, multiple satellites and outputs position data showing the position of the motor vehicle V as part of the behavior data, and a part of the CPS receiver 33 is exposed to, for example, the casing flat surface part 2A.

As the behavior data there are vehicle speed data, door opening and closing data showing an opening and closing of a door, or brake data showing ON/OFF of a brake transmitted from a vehicle speed sensor (not shown in the drawings) of the motor vehicle V, and the data is received through a connector CN.

Furthermore, the driving recorder 1 generally acts by being supplied from a vehicle battery (a power supply at a side of the vehicle, not shown in drawings) through the connector CN. In case that a power supply from the vehicle battery becomes scarce due to some cause, the driving recorder 1 can be switched automatically to an auxiliary power supply 9 and the auxiliary power supply 9 supplies electric power enough to drive the driving recorder 1 during at least the certain period.

The annunciation device 4 comprises, as shown in FIG. 2, LEDs 41 as being an illuminant exposed to an opposite side of the casing flat surface part 2A and a sound output body (not shown in drawings) such as a buzzer or a speaker built-in the casing 2.

The input device 5 is a button switch exposed to an opposite side of the casing flat surface part 2A.

The communication device 6 is hardware for wireless LAN that is built-in the casing 2 and that sends and receives each data by means of an analysis unit 10 arranged in a vehicle allocating center and the electromagnetic waves.

The removable recording device 7 is a CF memory card detachably mounted on a slot 2*b* opening toward a lateral side of the casing 2.

Figure 5:
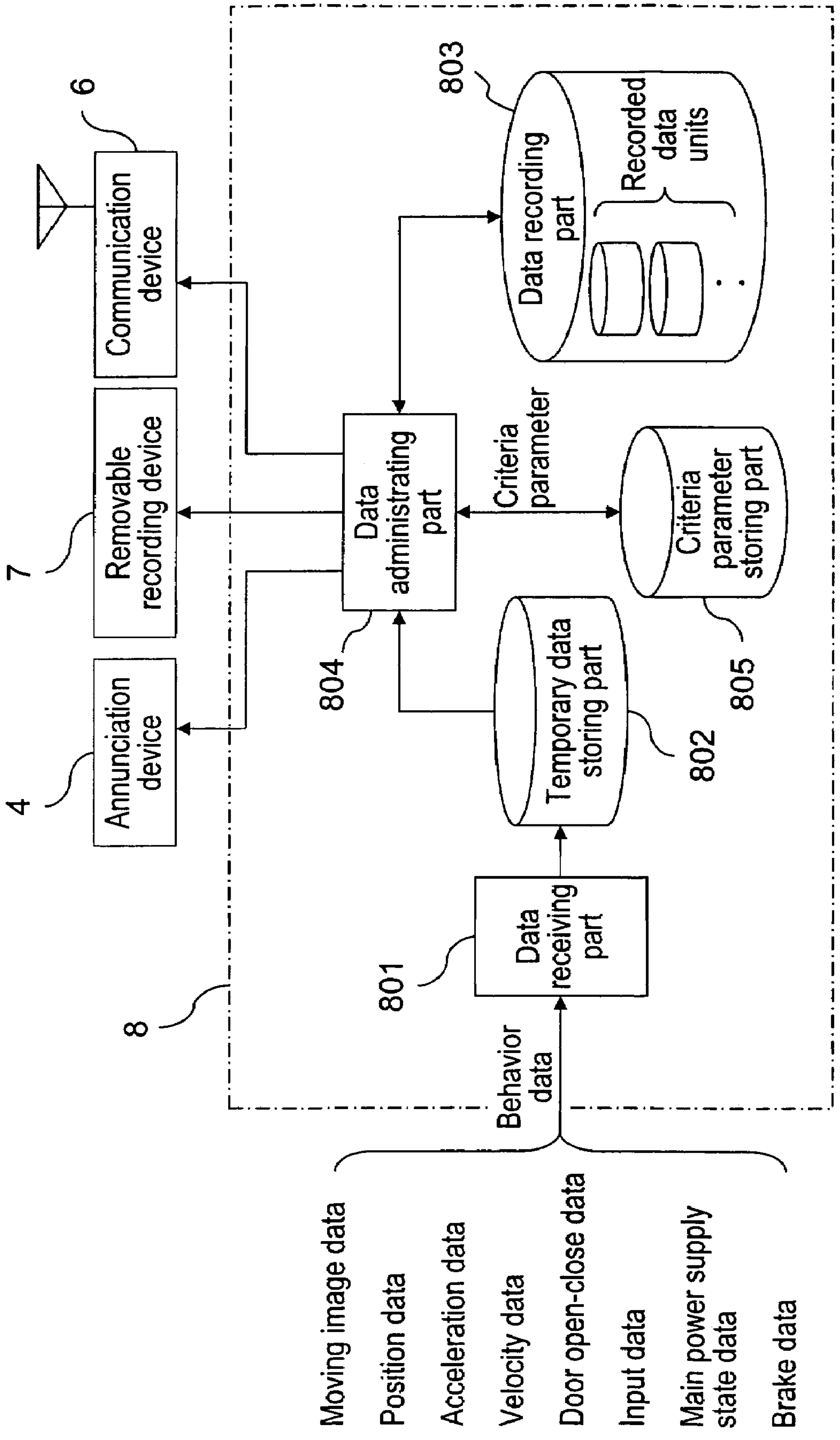
FIG. 5 is a functional block diagram of an information processing device of the driving recorder in accordance with this embodiment.

The information processing device 8 is, as shown in FIG. 4, structurally a so-called computer circuit that is built-in the casing 2 and that has a CPU 81, an internal memory 82 (for example, a nonvolatile memory) and an I/O buffer circuit 83 (there might be a case that an AD converter is also contained). As shown in FIG. 5, each device is controlled or information processed by operating the CPU 81 in accordance with a program stored in a predetermined area of the internal memory 82 which causes the CPU 81 to function as a data receiving part 801, a temporary data storing part 802, a data recording part 803, a data administrating part 804 and a criterion parameter storing part 805.

The data receiving part 801 receives the behavior data as being data concerning the behavior or the surrounding situation of the motor vehicle V at a constant sampling time one after another in a chronological order and writes the received behavior data one after another in the temporary data storing part 802 set in a predetermined area of the internal memory 82. If capacity of the temporary data storing part 802 becomes full, old data is sequentially erased and new behavior data is written in the temporary data storing part 802.

The data administrating part 804 judges whether or not the content of the behavior data stored in the temporary data storing part 802 meets a predetermined condition. Only in a case that the content meets the predetermined condition, behavior data during a certain time period before and after the behavior data whose content meets the predetermined condition is transferred as the recorded data units from the temporary data storing part 802 to the data recording part 803 arranged in the internal memory 82 or/and a predetermined area of the removable recording device 7.

A criterion parameter that is arranged to correspond to each behavior data is used in order to judge whether or not the content meets the predetermined condition. The criterion parameter is stored in advance in the criterion parameter storing part 805 arranged in a predetermined area of the internal memory 82. For example, in case that the behavior data is desired to be stored as the recorded data units when the motor vehicle V exceeds a predetermined acceleration or deceleration, the predetermined acceleration or deceleration is contained in the criterion parameter. Other types of criterion parameters can be used.

In addition, in this embodiment, the data administrating part 804 has a function of automatic and wireless transmission that automatically and wirelessly transmits the recorded data units stored in the data recording part 803 to the analysis unit 10 through the communicating device 6 and a function of transferring the recorded data units to the removable recording device 7 in case that the recorded data units are stored in the internal memory 82.

The function of automatic and wireless transmission is especially helpfully used in, for example, taxicabs or buses. More specifically, in the case that the motor vehicle V is in a specified place such as a vehicle allocating center, the function of automatic and wireless transmission is a function to automatically or manually open a wireless line to the analysis unit 10 in the vehicle allocating center and to transmit the recorded data units recorded in the data recording part 803 associated with the motor vehicle V or an identifier of a driver of the motor vehicle V through the communicating device 6.

Figure 6:
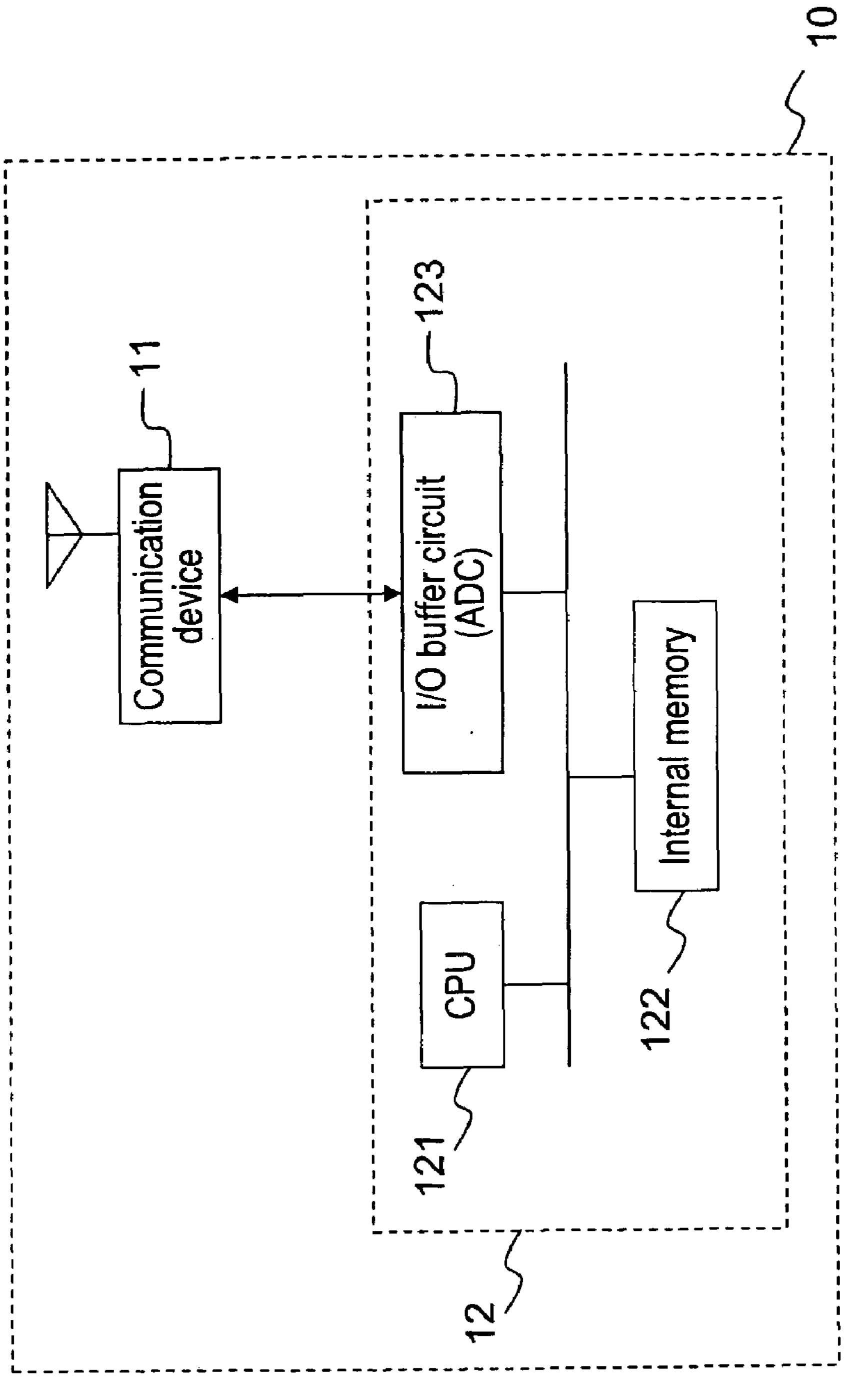
FIG. 6 is a pattern structural view of an analysis unit in accordance with this embodiment.

The analysis unit 10 arranged in the vehicle allocating center comprises, as shown in FIG. 6, a communicating device 11 and an information processing device 12.

Next, each part will be explained.

The communicating device 11 is hardware for wireless LAN that sends or receives each data by the use of the driving recorder 1 mounted on the motor vehicle V and the electromagnetic waves.

Figure 7:
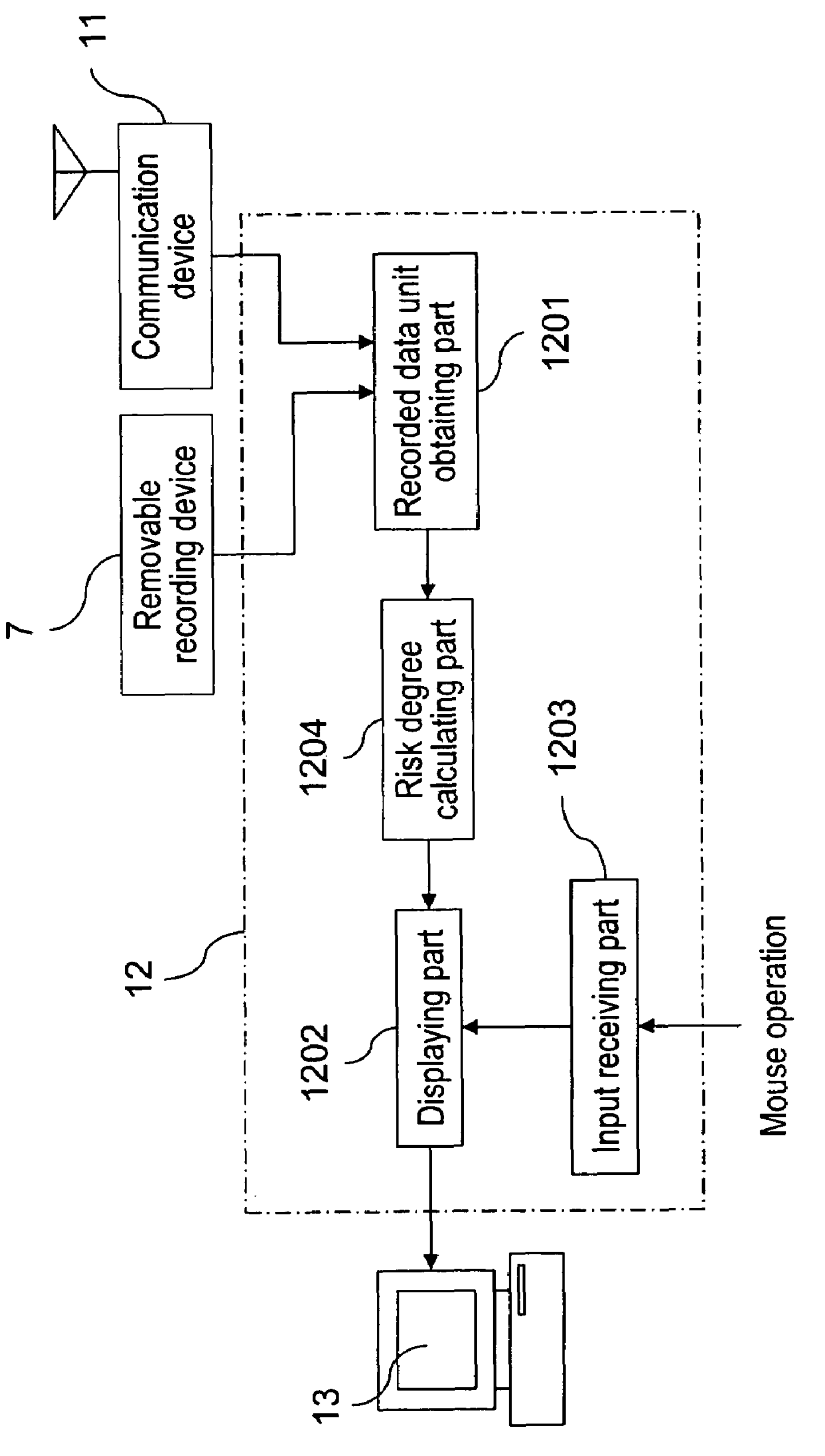
FIG. 7 is a functional block diagram of an information processing device of the analysis unit in accordance with this embodiment.

The information processing unit 12 is, as shown in FIG. 6, structurally a so-called computer circuit that is built-in the casing, not shown in drawings, and that has a CPU 121, an internal memory 122 (for example, a nonvolatile memory) and an I/O buffer circuit 123 (there might be a case that an AD converter is contained). As shown in FIG. 7, each device is controlled or information processed by operating the CPU 121 in accordance with a program stored in a predetermined area of the internal memory 122 and functions as a recorded data unit obtaining part 1201, a displaying part 1202, an input receiving part 1203, and a risk degree calculating part 1204.

The recorded data unit obtaining part 1201 obtains recorded data units recorded in a memory of the driving recorder 1, and more concretely, the recorded data units stored in the data recording part 803 of the driving recorder 1 are transferred to the analysis unit 10 through the communication devices 6, 11 or the removable recording device 7 and recorded in the recorded data units obtaining part 1201.

Figure 8:
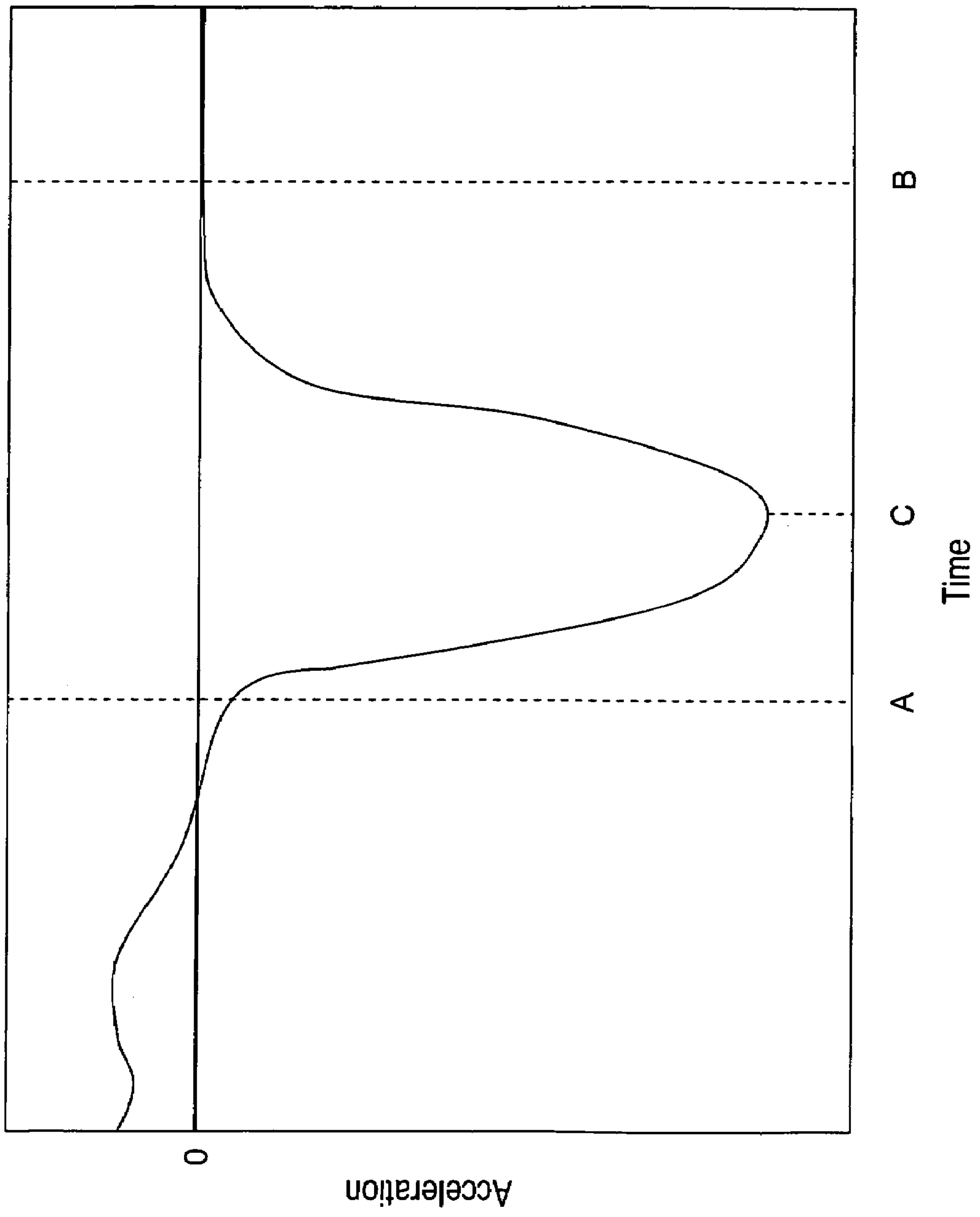
FIG. 8 is a graph showing acceleration data in accordance with this embodiment.

The recorded data units obtained in the recorded data unit obtaining part 1201 is sent to the risk degree calculating part 1204 and the risk degree for each recorded data units is calculated by the risk degree calculating part 1204. For example, differentiation is conducted once or several times on the vehicle acceleration data contained in the recorded data units, and a substantial acceleration acting period including a peak acceleration time point when the vehicle acceleration data becomes the minimum value is obtained from the obtained derivative value data and the vehicle acceleration data. Then the risk degree is calculated according to a predetermined table or a calculating formula based on the acceleration acting period and peak acceleration as being the minimum value of the vehicle acceleration data. For example, in case that the vehicle acceleration data changes as shown in FIG. 8, the peak acceleration time point is C, and the acceleration acting period is from A to B. Instead of the derivative value data, or together with the derivative value data, a change amount of the vehicle acceleration data may be obtained and the risk degree may be calculated by the use of the obtained difference value. In addition, in case that credibility of the actually measured value of the vehicle acceleration data is low, the minimum acceleration is approximated based on the derivative value of the vehicle acceleration data and the minimum acceleration may be considered as the peak acceleration.

Figure 9:
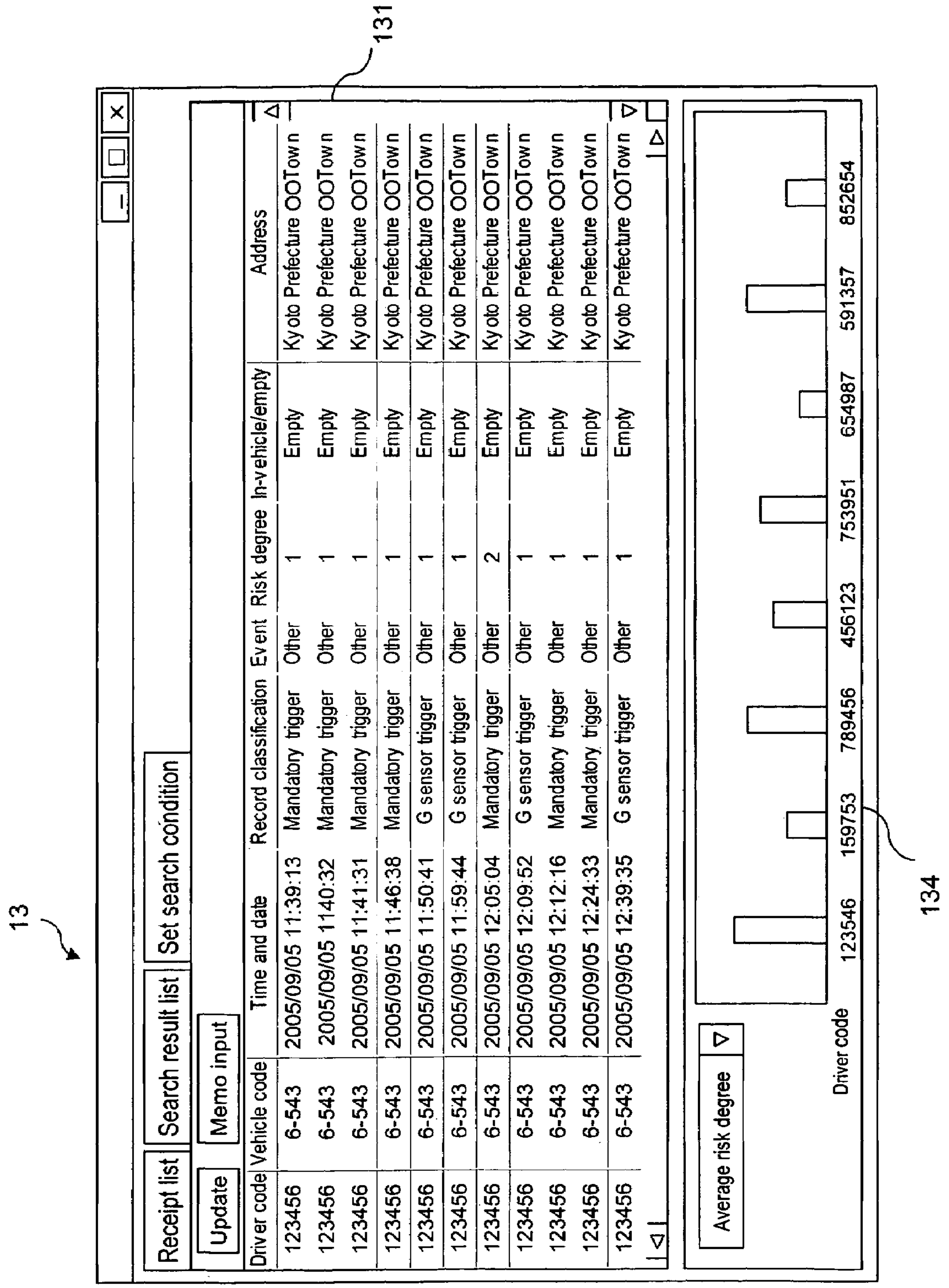
FIG. 9 is a view showing a state of a displayed window in accordance with this embodiment.
Figure 10:
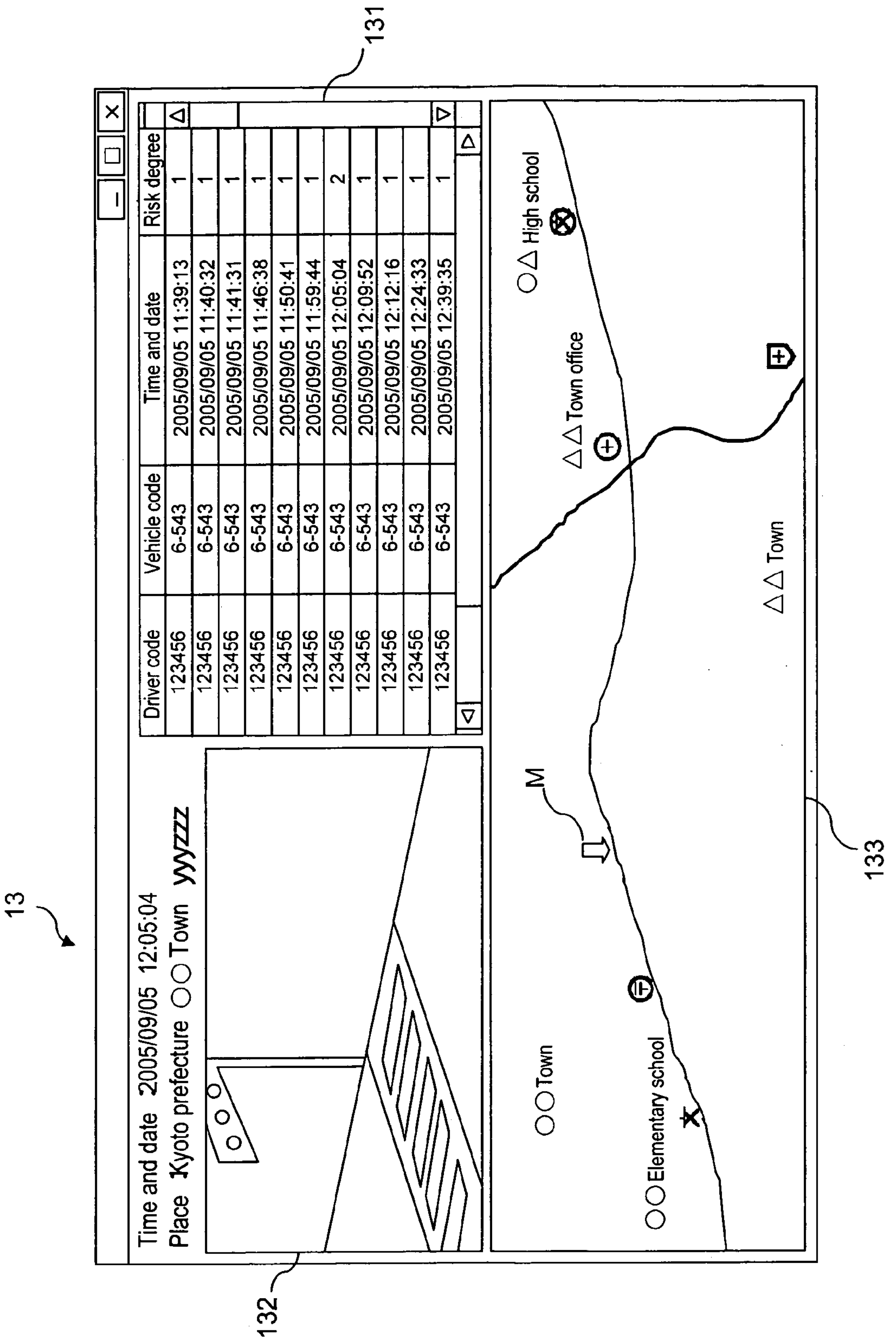
FIG. 10 is a view showing a state of a displayed window in accordance with this embodiment.

Each recorded data unit to which the risk degree is given in the risk degree calculating part 1204 is next sent to the displaying part 1202. As shown in FIG. 9 and FIG. 10, the displaying part 1202 displays a content concerning at least a predetermined item among the contents shown by each recorded data units in a form of a table or a graph sectioned for each recorded data units on a display 13. The predetermined item may be arbitrarily selected, and may contain, for example, an identification number of a driver or a motor vehicle, time and date when the recorded data unit occurs, and its risk degree. The display 13 may be arranged on the analysis unit 10, and an exterior monitor may be connected to the analysis unit 10 so as to be the display 13.

As shown in FIG. 9, if an item as being the risk degree is provided with the simply listed recorded data units and the calculated risk degree is displayed, it becomes easy to extract the desired recorded data units. In addition, it becomes easier to browse the desired data if a function of being able to sort in an order of a risk degree level or a function of being able to narrow down recorded data units of a predetermined risk degree alone is given to the analysis unit 10. In addition, if a driver code, a vehicle code, a record classification, a kind of an event, in-vehicle/empty, or an address is displayed in the table 131 and the desired recorded data unit is double-clicked, a graph'showing a change of the acceleration data or the recorded data units or its detailed information can be displayed. Furthermore, if the risk degree is given to each recorded data unit, it becomes possible to calculate an average risk degree of a driver and to display it in a graph 134, thereby to compare the graph 134 for each driver.

If designation to either one of the recorded data units is input to the input receiving part 1203, the displaying part 1202 displays a map 133 showing a place where the recorded data units is recorded or a recorded image 132 of inside or outside the vehicle contained in the recorded data units on the same display 13 as that of the table 131 in accordance with the designation. More concretely, for example, as shown in FIG. 10, if the desired recorded data unit is clicked by a mouse or the like on the table 131 of the recorded data units displayed on the display 13, the map 133 to which a mark M showing a place where the recorded data units are recorded and a recorded image 132 of outside the vehicle during a certain period before and after the time when the recorded data units are recorded are displayed on the display 13 together with the table 131. Each layout of the table 131, the map 133 and the recorded image 132 of the relevant recorded data units may be arbitrarily changed on the display 13, and either one of the map 133 and the recorded image 132 may be displayed.

In accordance with the arrangement of this embodiment, it is possible to rank multiple recorded data units by the use of the risk degree as an index, which makes it easy to extract necessary recorded data units or to classify the recorded data units in an order of importance. As a result, it is possible to easily and accurately to make an after-the-fact analysis such as a cause analysis of an accident at a time of an accident or a cause analysis of a situation at a time when a driver should feel concern because he or she is close to being involved in an accident, even though the situation does not result in an accident.

The present claimed invention is not limited to the above-mentioned embodiment. For example, the behavior data obtained by the driving recorder 1 may contain information on a brake action such as a time, duration or a number of times to press a brake pedal, or information on a blinker's operation.

In addition, a driving recorder 1 that takes images of a surrounding situation is represented as an example of the vehicle behavior data collecting unit in the above embodiment, however, the vehicle behavior data collecting unit is not limited to this mode and may contain a driving control system that controls the acceleration data or car velocity pulse and analyzes a driving condition.

The calculation of the risk degree may be conducted by an operator by directly checking the recorded data units, and the driving recorder 1 may be provided with the risk degree calculating part 1204 wherein the risk degree is contained in the recorded data units transmitted from the driving recorder 1 to the analysis unit 10.

It is a matter of course that the present claimed invention may be variously modified without departing from the spirit of the invention.

The invention claimed is:

1. A vehicle behavior analysis system that is arranged on a vehicle comprising:

a vehicle behavior data collecting unit that records information on the vehicle's driving operation as behavior data, the vehicle behavior data collecting unit including a sampling part that samples the behavior data sequentially, and a data recording part that records, when the sampled behavior data meets a predetermined condition, behavior data during a certain time period before and after the sampled behavior data as recorded data units in a built-in memory; and an analysis unit for analyzing a recorded information of the vehicle behavior data collecting unit, the analysis unit including a recorded data unit obtaining part that obtains the recorded data units containing vehicle acceleration data in the memory of the vehicle behavior data collecting unit, and a displaying part that displays on a display contents of the recorded data units and a risk degree corresponding to the recorded data units in a table, wherein the risk degree is calculated from an acceleration value at a time of a peak acceleration shown by the vehicle acceleration data and an acceleration value during a substantial acceleration applying period, the substantial acceleration applying period containing the time of the peak acceleration.

2. The vehicle behavior analysis system described in claim 1, wherein the recorded data units contain at least information on a position of the vehicle and/or a recorded image of a driving condition of the vehicle, and the analysis unit further comprises an input receiving part that receives an input for selecting one of the recorded data units, wherein the displaying part displays a map showing a place where the recorded data units are recorded and/or the recorded image contained in the recorded data units on the same display.

3. The vehicle behavior analysis system described in claim 1, further comprising a risk degree calculating part that calculates the risk degree.

4. The vehicle behavior analysis system described in claim 3, wherein the acceleration applying period is derived from derivative value data obtained by conducting differentiation once or multiple times on the vehicle acceleration data.

5. An analysis unit for analyzing a recorded content of a vehicle behavior data collecting unit that comprises:

a recorded data unit obtaining part that obtains recorded data units containing vehicle acceleration data from a memory of the vehicle behavior data collecting unit comprising a sampling part that sequentially samples behavior data as information concerning the vehicle's driving operation, and a data recording part that records, when the sampled behavior data meets a predetermined condition, behavior data during a certain time period before and after the sampled behavior data as recorded data units in the memory; and a displaying part that displays on a display contents of the recorded data units and a risk degree corresponding to the recorded data units in a table, wherein the risk degree is a calculated value from an acceleration value at a time of a peak acceleration shown by the vehicle acceleration data and an acceleration value of a substantial acceleration applying period, the substantial acceleration applying period containing the time of the peak acceleration.

6. The analysis unit described in claim 5, wherein the recorded data units contain at least information on a position of the vehicle and/or a recorded image of a driving condition of the vehicle, and further comprises an input receiving part that receives an input for selecting one of the recorded data units shown in the table, and the displaying part displays a map showing a place where the selected recorded data unit is recorded and/or the recorded image contained in the recorded data unit on the same display.

7. The vehicle behavior analysis system described in claim 1 further including a casing for housing the vehicle behavior data collecting unit, a Local Area Network (LAN) transmitter and receiver, a GPS receiver, a camera, and an acceleration sensor, wherein the casing is of a compact configuration for mounting directly by adhesion at any portion of a windshield of the vehicle without obstructing a drivers's view.

8. The vehicle behavior analysis system described in claim 7 wherein the casing is configured in an egg-shaped form with a surface part of a generally elliptical shape with an adhesive portion.

9. The vehicle behavior analysis system described in claim 8 wherein the camera is mounted in the casing with an adjustable image reception area positioned within the generally elliptical shape to aim the camera through the windshield of the vehicle.

10. A vehicle behavior analysis system that is arranged on a vehicle traveling along a road comprising:

a vehicle behavior data collecting unit that records information on the vehicle's driving operation along the road as behavior data, the vehicle behavior data collecting unit including a sampling part that samples the behavior data sequentially, a data recording part that records, when the sampled behavior data meets a predetermined condition, behavior data during a certain time period before and after the sampled behavior data as recorded data units in a built-in memory, and a casing for housing the vehicle behavior data collecting unit, a Local Area Network (LAN) transmitter and receiver, a GPS receiver, a camera, and an acceleration sensor, wherein the casing is of a compact configuration for mounting directly by adhesion at any portion of a windshield of the vehicle without obstructing a driver's view; and an analysis unit for analyzing a recorded information of the vehicle behavior data collecting unit, the analysis unit including a recorded data unit obtaining part that obtains the recorded data units containing vehicle acceleration data in the memory of the vehicle behavior data collecting unit, and a displaying part that displays on a display contents of the recorded data units and a risk degree corresponding to the recorded data units in a table, wherein the risk degree is calculated from an acceleration value at a time of a peak acceleration shown by the vehicle acceleration data and an acceleration value during a substantial acceleration applying period, the substantial acceleration applying period containing the time of the peak acceleration.

* * * * *